June 4, 1968 M. MÜLLER ET AL 3,387,231

CIRCULATOR FOR MICROWAVE TRANSCEIVERS

Filed Oct. 1, 1964

United States Patent Office 3,387,231

Patented June 4, 1968

3,387,231
CIRCULATOR FOR MICROWAVE TRANSCEIVERS

Martin Müller and Adolf Frank, Pforzheim, Germany, assignors to International Standard Electric Corporation, New York, N.Y., a corporation of Delaware Filed Oct. 1, 1964, Ser. No. 400,650
Claims priority, application Germany, Oct. 2, 1963, St 21,136
2 Claims. (Cl. 333—1.1)

ABSTRACT OF THE DISCLOSURE

A circulator is provided with three terminals connected to one another via three line sections. The line sections are chosen in length to cause either a 180° pulse shift or a full 360° phase shift between terminals. In one embodiment, all line sections cause a 360° phase shift; in another, two lines cause 180° phase shifts and one causes a 360° phase shift. A non-reciprocal phase shifter is provided in one line section to alter the phase shift in one direction through that line section by 180° and thereby to cause cancellation of signals in particular directions between selected terminals.

Figure 1:
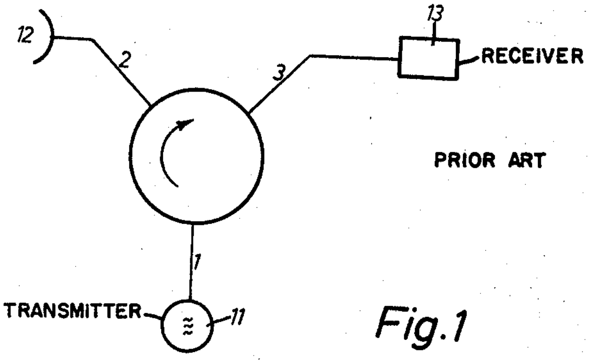

As is well-known, the term circulator refers to an electric element or waveguide component comprising $n$ cyclically arranged branching terminals having the property that an energy entering at the terminal $\gamma$, is only transmitted to the terminal $\gamma+1$. Most customarily used are circulators according to FIG. 1 comprising $n=3$ connecting terminals in which to the terminal 1 there is connected a transmitter 11, in which to the terminal 2 there is connected the antenna 12, and in which to the terminal 3 there is connected the receiver 13. In such a conventional type of circulator the transmitter 11 only feeds the antenna, whereas the receiver 13 is decoupled from the transmitter 11 without requiring any additional frequency selection. The received power as coming from the antenna 12 is only applied to the receiver 13, and is decoupled from the transmitter 11. According to the prior art it is already known to design such types of circulators, especially such ones for microwaves.

Moreover it is also known that in a microwave transceiver, the transmitter frequency can be simultaneously used as the receiving oscillator. This very economical measure is obvious insofar as the transmitting power often has about the same magnitude as the receiving oscillator power required for a low-noise mixing. Accordingly, the conventional loose coupling of the mixer to the oscillator becomes uneconomical, so that a normal type of circulator cannot be used to this end. Since in such types of equipments the transmitting and receiving frequencies only have a relative spacing of about one percent from one another, the transmitter and the receiver are incapable of being decoupled from one another by employing a frequency selection. It would only be possible to connect the oscillator, the mixer, and the antenna directly in parallel. With the aid of such a measure, however, in the most favourable case, 3 db of the transmitting power would be lost by reflection, and 3 db of the receiver noise figure would be lost due to the attenuation effected by the internal resistance of the oscillator. A system loss of 6 db, however, is not only uneconomical, but also causes a loss of half the range of transmitter.

It is one object of the present invention to provide a three-terminal circulator which is suitable for being used in microwave transceivers by providing the aforementioned double utilization of the transmitting energy. According to the present invention a preferred embodiment of such a circulator will have the following properties:

Terminal 1: capable of coupling in both directions,
Terminal 2: circulatory coupling in one direction only,
Terminal 3: non-coupling.

Figure 2:
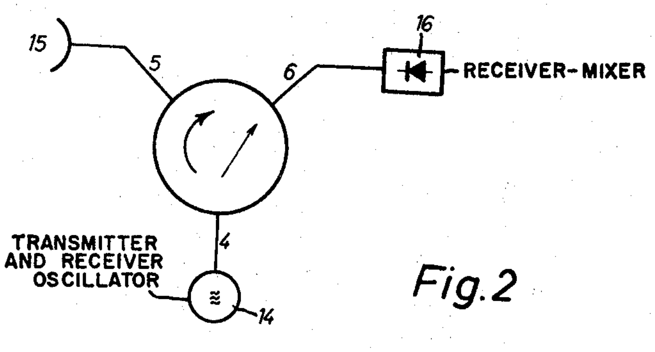

According to FIG. 2 it would be necessary with respect to such a type of circulator, to connect to the terminal 4 the transmitter 14 which also serves as the receiving oscillator, and, by employing a matching, to feed the receiving mixer 16 as well as the antenna 15 at equal parts. The antenna 15 which is connected to the terminal 5 would only be allowed to supply the receiving mixer 16 not acting as a generator.

For realizing such a type of component which might be termed an inverted circulator, and in further embodying the invention, the three terminals of the circulator are connected to one another via line sections having a length of $n\lambda/2$ ($n$ arbitrary integer multiple), and the line section which is adapted to connect the terminal coupling in both directions to the terminal of the non-coupling type, is provided with a non-reciprocal phase shifter which is only effective in the direction from the non-coupling terminal to the terminal coupling in both directions, and either shortening or extending the latter by $\lambda/2$.

A suitable non-reciprocal phase shifter may be selected of the type referred to in the United States patent to Tillotson No. 2,866,949. Further details relating to such phase shifter may be found in the article entitled "Ferrites at Microwaves" by N. G. Sakiotis and H. N. Chait, in the Journal of the Institute of Radio Engineers for January 1953 at pages 87 through 93, inclusive.

Figure 3:
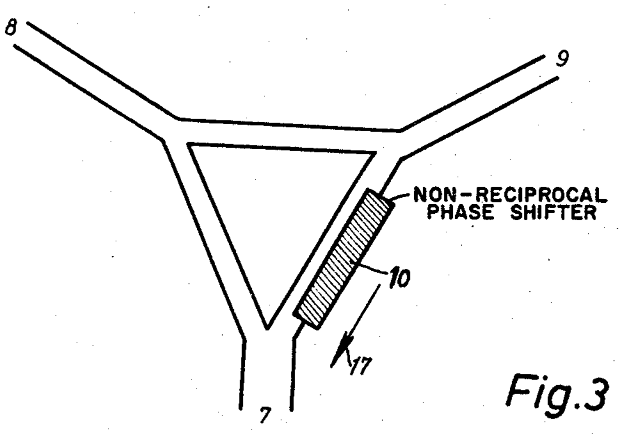

The invention will now be explained in detail with reference to an exemplary, embodiment shown in FIG. 3. In this example the lengths of line sections of all triangular connecting members amounts to $\lambda$. Hence, in this case $n=2$, the transmitter is connected to the terminal 7; the antenna is connected to the terminal 8; and the receiver is connected to the terminal 9. In this arrangement a length of line of $\lambda/2$ corresponds to a phase shift by 180°. The reference numeral 10 indicates the non-reciprocal phase shifter which is inserted in the line section connecting the terminals 7 and 9, with this phase shifter effecting a delay by 180° of a wave travelling from terminal 9 to terminal 7, while leaving unaffected a wave travelling in the opposite direction.

A wave entering the waveguide at terminal 7, is split up in two halves at the branching point. The wave travelling to the left towards the terminal 8 suffers a phase shift of 360°, and the wave travelling to the right via the terminal 9 towards the terminal 8, suffers a phase shift of 720°. The phase shift towards the terminal 9 is of a just reversed behaviour. The two partial waves appear in-phase at the two terminals 8 and 9; accordingly, each time one half enters the terminals 8 and 9. The terminal 7 must have half the characteristic impedance of the triangular line.

A wave fed-in at the terminal 8 is likewise divided into two equal parts towards the left and the right, and suffers on its left-hand part a phase shift of 360° at terminal 9, and on its right-hand part via terminal 7 a phase shift of 720° at terminal 9. Accordingly, there exists a phase equality, so that the total power is transmitted via the terminal 9. Towards the terminal 7 the phase shift of the right-hand partial wave amounts to 360°, and that of the left-hand partial wave via terminal 9 amounts to 900°. Accordingly, the partial waves are of opposite phase relation to one another, and cancel each other. Thus, none of the power coming from the terminal 8 is transmitted via the terminal 7. The characteristic impedance of terminal 8 is equal to that of the triangular line. A wave entering the terminal 9 is likewise subjected to the splitting. Towards the terminal 8 its right-hand portion suffers a phase shift of 360°, and its left-hand portion suffers a phase shift of 900°, and towards the terminal 7 its right-hand portion suffers a phase shift of 720°, and its left-hand portion suffers a phase shift of 540°. Accordingly, opposite phase relations exist at both terminals, and the waves cancel each other. The branching at the terminal 9 acts as a short circuit to a wave entered at this point. The characteristic impedance of terminal 9 must be equal to that of the triangular line section.

There will result another possibility for realizing the inventive type of circulator when choosing the lengths of the lines from terminal 8 to terminal 9, and from terminal 8 to terminal 7 to be equal to $\lambda/2$, and when choosing the length of line from terminal 7 to terminal 9 to be equal to $\lambda$ (one wavelength), and by providing a phase shifter in the line section connecting the terminals 7 and 9 reducing this section by $\lambda/2$ (one half of a wavelength), for a wave propagating in the direction indicated by the arrow 17. In such an arrangement the final result will be the same. A wave entered at terminal 7 is applied at equal parts to both the terminals 8 and 9. A wave entered at terminal 8 is only applied to terminal 9, and with respect to a wave entered at terminal 9 there will exist a short circuit.

The described one-side inverted circulator may be used advantageously in all cases where a source must be connected to two loads having corresponding decoupling requirements, of which the one, in turn, acts as a source for the second load, as applicable to the fields of measuring technique, for example, for the multiple-frequency conversion purpose.

While we have described above the principles of our invention in connection with specific apparatus, it is to be clearly understood that this description is made only by way of example and not as a limitation to the scope of our our invention as set forth in the objects thereof and in the accompanying claims.

What we claim is:

1 A three-terminal circulator for use as a microwave transceiver, comprising:
- a circulatory terminal for connection to an antenna,
- a two-directional terminal for connection to a transmitter-receiver oscillator,
- a non-coupling terminal for connection to a receiver-mixer,

- three microwave line sections,
- means connecting said three terminals to one another via said three line sections to provide equal phase shifts of 360° between terminals, and
- a non-reciprocal phase shifter inserted in a first line section positioned between the non-coupling terminal and the two-directional terminal,
- said non-reciprocal phase shifter and said first line section together serving to provide a total phase shift of 540° for signals passing in the direction from the non-coupling terminal to the two-directional terminal and providing a phase shift of 360° for signals passing in the direction from the two-directional terminal to the non-coupling terminal,
- whereby signals received at the two-directional terminal over two line sections are 180° out of phase with each other and cancel each other whereas signals received at all other terminals are in phase and add together.

2. A three-terminal circulator as claimed in claim 1, in which
- the first time section is selected to provide a phase shift of 360°,
- the other two line sections are selected to provide a phase shift of 180°, and
- the non-reciprocal phase shifter is positioned in the first line section to provide a 540° phase shift for signals passing in the direction from the non-coupling terminal to the two-directional terminal.

References Cited

UNITED STATES PATENTS

| | | | |
|---|---|---|---|
| 2,866,949 | 12/1958 | Tillotson | 333—11 |
| 2,972,047 | 2/1961 | Werner et al. | 325—20 |
| 3,036,278 | 5/1962 | Chait | 333—1.1 |
| 3,089,101 | 5/1963 | Chait | 333—1.1 |
| 3,095,561 | 6/1963 | Hubka | 325—20 X |
| 3,113,269 | 12/1963 | Essam | 325—24 |
| 3,226,659 | 12/1965 | Stracca | 333—1.1 |

OTHER REFERENCES

Grace et al., Proc. I.R.E., August 1960, p. 1497, 1498.

HERMAN KARL SAALBACH, *Primary Examiner.*

JOHN W. CALDWELL, ELI LIEBERMAN, *Examiners.*

C. BARAFF, *Assistant Examiner.*